(12) United States Patent
Peng et al.

(10) Patent No.: US 7,701,706 B2
(45) Date of Patent: Apr. 20, 2010

(54) FIXING APPARATUS FOR HARD DISK DRIVE

(75) Inventors: Wen-Tang Peng, Taipei Hsien (TW); Guang-Yi Zhang, Shenzhen (CN); Zhe Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 80 days.

(21) Appl. No.: 11/963,864

(22) Filed: Dec. 24, 2007

(65) Prior Publication Data

US 2009/0101781 A1 Apr. 23, 2009

(30) Foreign Application Priority Data

Oct. 19, 2007 (CN) .................. 2007 1 0202173

(51) Int. Cl.
*G06F 1/16* (2006.01)
(52) U.S. Cl. .............. 361/679.37; 439/638; 364/708.1; 248/633
(58) Field of Classification Search ............. 364/708.1; 439/638; 361/679.35, 679.26, 679.27, 679.3; 248/618, 633
See application file for complete search history.

(56) References Cited

U.S. PATENT DOCUMENTS

| 5,654,873 A * | 8/1997 | Smithson et al. ....... 361/679.37 |
| 2007/0211422 A1* | 9/2007 | Liu et al. .................... 361/685 |
| 2009/0073649 A1* | 3/2009 | Ikeda et al. ............ 361/679.35 |

* cited by examiner

*Primary Examiner*—Hung V Duong
(74) *Attorney, Agent, or Firm*—Frank R. Niranjan

(57) ABSTRACT

An exemplary fixing apparatus is for mounting a hard disk drive (HDD) having a plurality of holes defined in sidewalls and includes a first side plate, a bracket, and a plurality of fixing pins. The bracket includes an end plate, and a second side plate perpendicular to the end plate. One end of the first side plate is pivotably attached to a free end of the end plate of the bracket. The other end of the first plate includes a latch extending therefrom. The second side plate includes a latch extending from a free end thereof, to detachably engage with the latch of the first side plate. The fixing pins are attached to the first side plate and the second side plate to engage in the holes of the HDD.

17 Claims, 4 Drawing Sheets

FIXING APPARATUS FOR HARD DISK DRIVE

CROSS-REFERENCES TO RELATED APPLICATION

Relevant subject matter is disclosed in the 6 co-pending U.S. patent application Ser. Nos. 11/963,871, 11/963,869, 11/963,868, 11/963,867, 11/963,865, 11/963,870; filed on the same date and having a same title as the present application, which are assigned to the same assignee as this patent application. Relevant subject matter is also disclosed in the co-pending U.S. patent application Ser. No. 11/953,863, filed on Dec. 11, 2007, having a same title as the present application, which is assigned to the same assignee as this patent application.

BACKGROUND

1. Field of the Invention

The present invention relates to fixing apparatuses, and particularly to a fixing apparatus for hard disk drives (HDDs).

2. Description of Related Art

The conventional approach now being adopted to mount an HDD in a computer chassis generally involves placing the HDD in a holding area of a drive bracket; screwing a plurality of screws through side walls of the drive bracket into two sides of the HDD to fasten the HDD on the drive bracket; and mounting the HDD and the bracket in a computer chassis or a mobile HDD rack. For proper balanced installation of the HDD, multiple screws should be fastened at the same time, making installation and removal of the HDD tedious.

What is desired, therefore, is a fixing apparatus which allows convenient installation and removal of an HDD.

SUMMARY

An exemplary fixing apparatus is for mounting a hard disk drive (HDD) having a plurality of holes defined in sidewalls and includes a first side plate, a bracket, and a plurality of fixing pins. The bracket includes an end plate, and a second side plate perpendicular to the end plate. One end of the first side plate is pivotably attached to a free end of the end plate of the bracket. The other end of the first plate includes a latch extending therefrom. The second side plate includes a latch extending from a free end thereof, to detachably engage with the latch of the first side plate. The fixing pins are attached to the first side plate and the second side plate to engage in the holes of the HDD.

Other advantages and novel features will become more apparent from the following detailed description when taken in conjunction with the accompanying drawings, in which:

DETAILED DESCRIPTION OF THE EMBODIMENT

Figure 1:
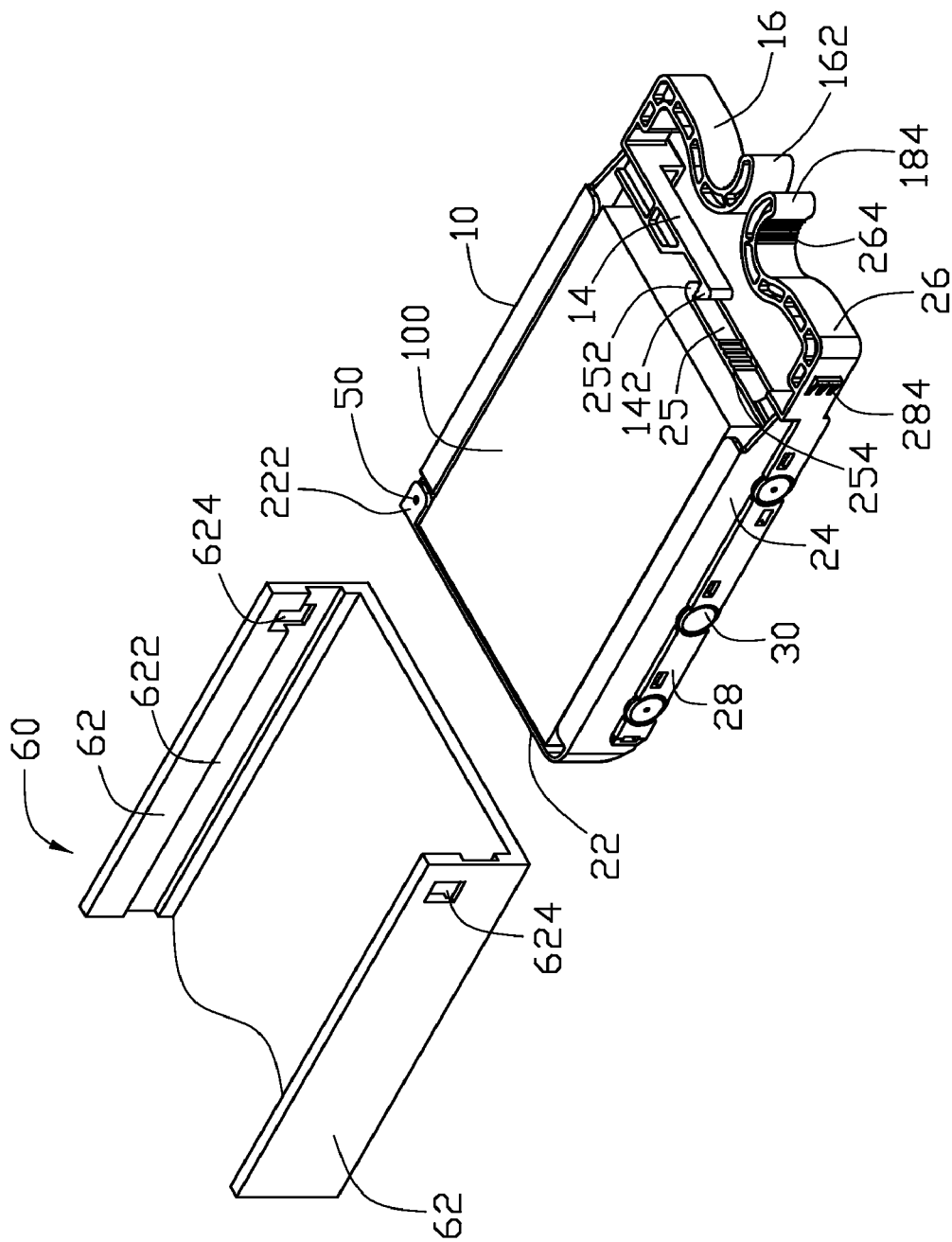
FIG. 1 is an isometric view of a fixing apparatus of an embodiment of the present invention assembled with an HDD, and a rack.
Figure 2:
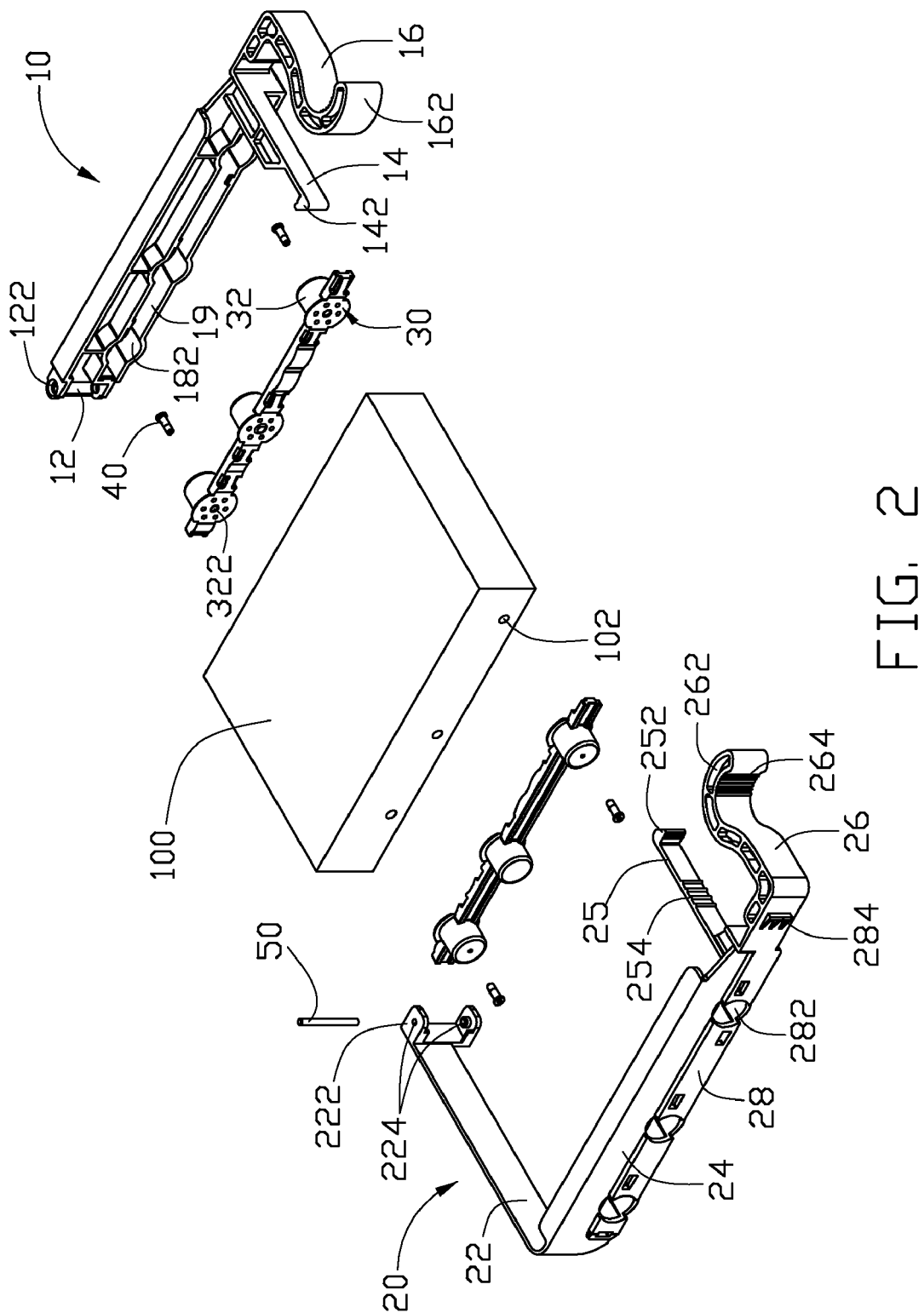
FIGS. 2 and 3 are exploded, isometric views of the fixing apparatus of FIG. 1, but viewed from different aspects.

Referring to FIGS. 1 to 2, a fixing apparatus in accordance with an embodiment of the present invention is for fixing a hard disk drive (HDD) 100 in a rack 60. The fixing apparatus includes a first side plate 10, and a bracket 20, a pair of shock absorbing bars 30, a plurality of fixing pins 40 made of metal, and a shaft 50.

The rack 60 includes a pair of parallel sidewalls 62 defining a receiving space therebetween. A pair of railways 622 is defined at the insides of the sidewalls 62, respectively. A pair of locking holes 624 is defined in the sidewalls 62 beside the railways 622, respectively.

The HDD 100 includes a pair of holes 102 defined in each of two opposite sidewalls thereof.

Figure 3:
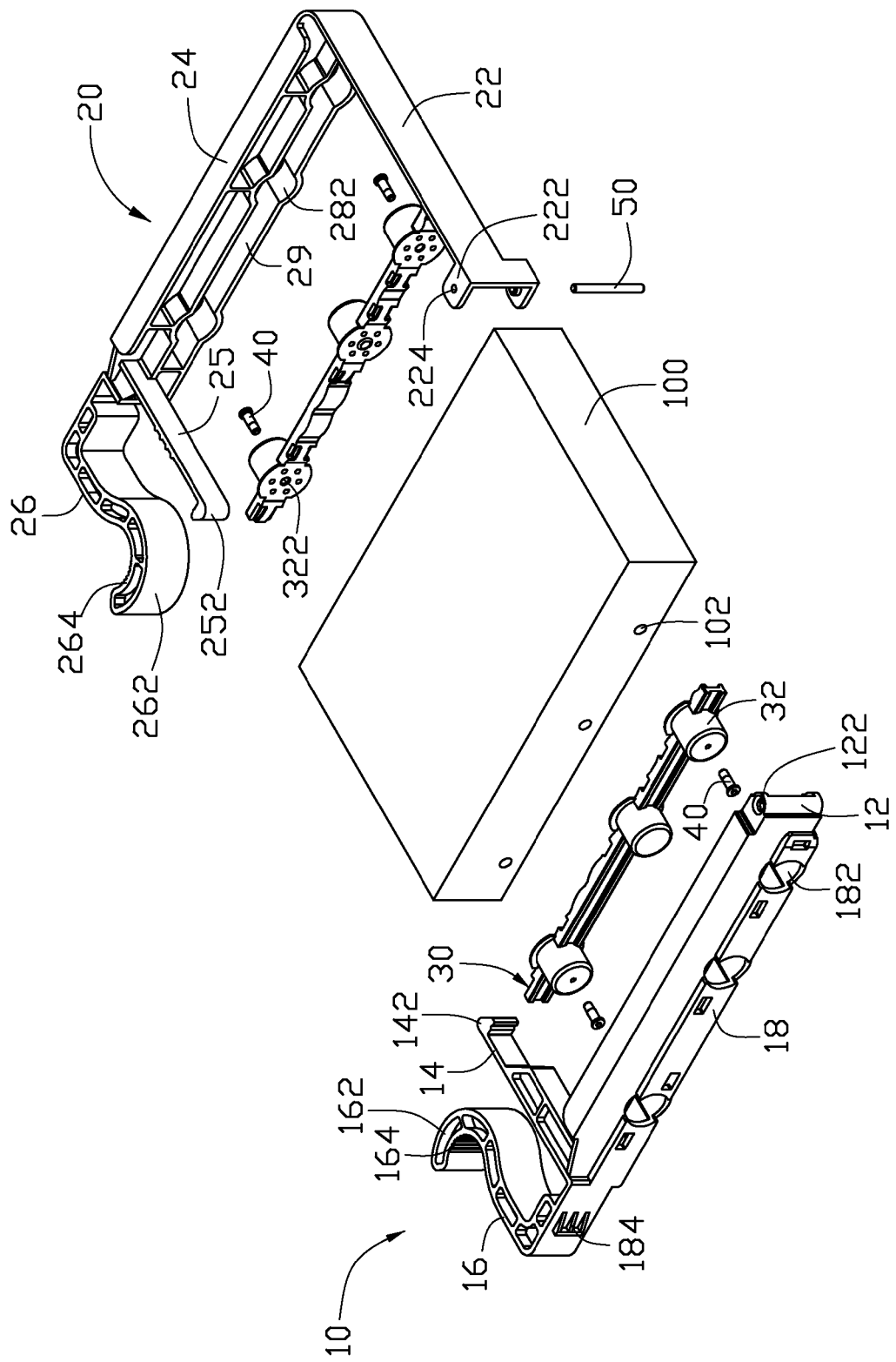

Referring also to FIG. 3, the first side plate 10 includes a pivoting portion 12 having a pivoting hole 122 formed at one end thereof, and a latch 14 extending perpendicularly from an inside of and near the other end thereof, and an operating arm 16 extending perpendicularly from the inside at the other end thereof. The latch 14 includes a hook 142 formed at the distal end thereof facing inward. The operating arm 16 has a J-shaped configuration, facing outward. A toothed urging portion 164 is formed at the inside of an arced free end 162 of the operating arm 16. The first side plate 10 includes a long platform 18 extending from an outside thereof, and a retaining groove 19 formed in the inside thereof. A plurality of mounting holes 182 is defined in the platform 18 communicating with the retaining groove 19, extending to the first side plate 10. A wedged block 184 extends outward from an outside wall of the platform 18 near the operating arm 16.

Referring also to FIG. 3, the bracket 20 includes an end plate 22, a second side plate 24 perpendicularly extending from one end of the end plate 22. The end plate 22 includes a pair of parallel tabs 222 each having a pivoting hole 224 extending perpendicularly from the inside of a free end thereof. The second side plate 24 includes a latch 25 extending perpendicularly from an inside of and near a free end thereof, and an operating arm 26 extending perpendicularly from the inside at the free end thereof. The latch 25 includes a hook 252 formed at the distal end thereof facing outward. The operating arm 26 has a J-shaped configuration, facing outward. A toothed urging portion 264 is formed at the inside of the arced free end 262 of the operating arm 26. The second side plate 24 includes a long platform 28 extending from the outside thereof, and a retaining groove 29 formed in the inside thereof. A plurality of mounting holes 282 is defined in the platform 28 communicating with the retaining groove 29, and extending to the second side plate 24. A wedged block 284 extends outward from an outside wall of the platform 28 near the operating arm 26.

Each of the shock absorbing bars 30 is elongated and made of conductive rubber. A plurality of cylindrical mounting portions 32 is formed in each of the shock absorbing bars 30. A central through hole 322 is defined in each of the mounting portions 32.

In assembly, the fixing pins 40 are inserted into the central through holes 322 of the shock absorbing bars 30. The shock absorbing bars 30 are retained in the receiving groove 19 of the first side plate 10 and the groove 29 of the second plate 24 of the bracket 20, respectively, with the mounting portions 32 extending through the mounting holes 182 of the first side plate 10 and the mounting holes 282 of the second plate 24 of the bracket 20.

The first side plate 10 is pivotably attached to the end plate 22 of the bracket 20, with the pivoting portion 12 of the first side plate 10 sandwiched between the tabs 222 of the bracket 20. The shaft 50 extends through the pivoting holes 224 of the bracket 20 and the pivoting hole 122 of the first side plate 10.

The hook 142 of the latch 14 of the first side plate 10 detachably engages with the hook 252 of the latch 25 of the bracket 20.

Figure 4:
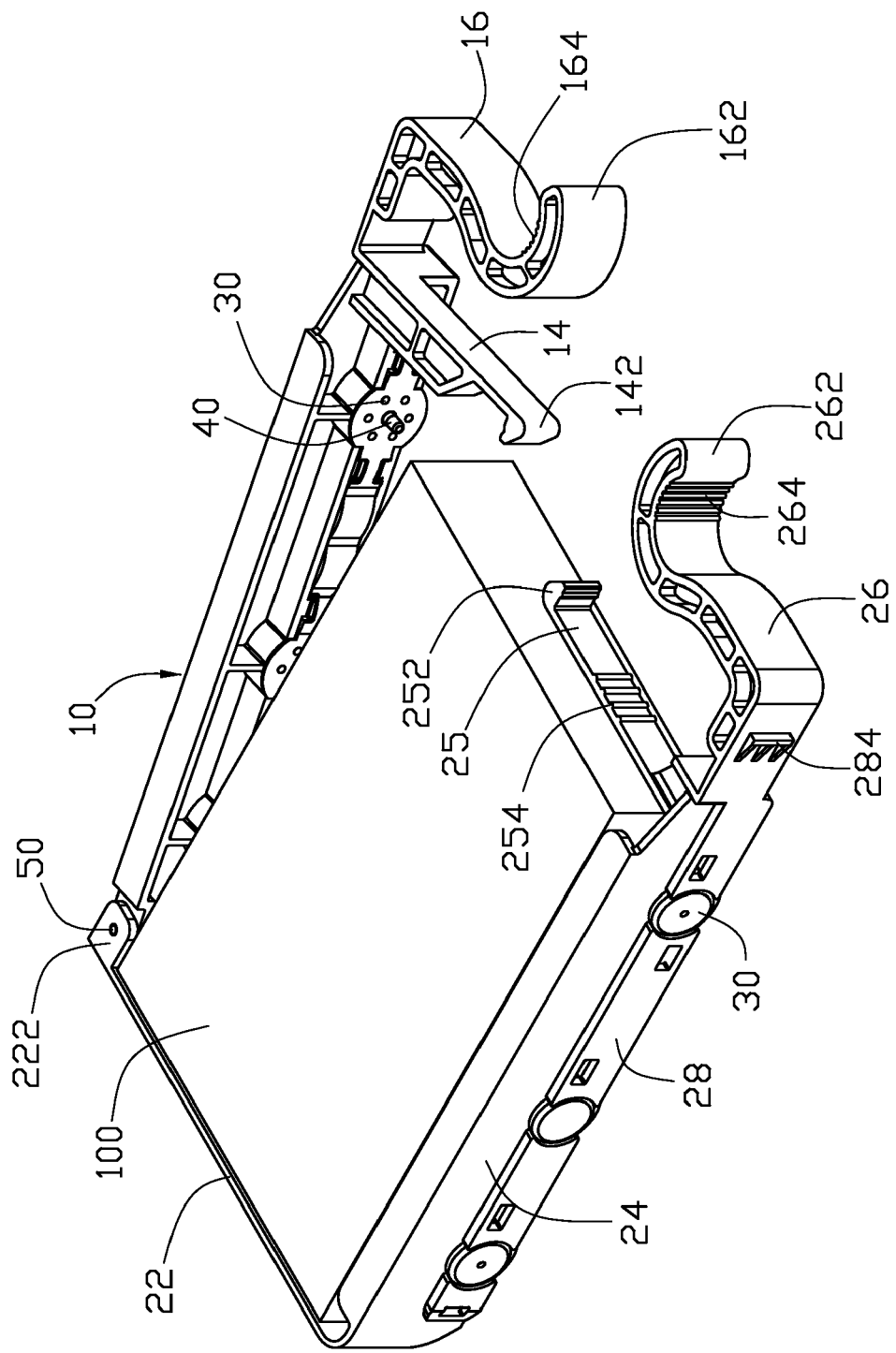
FIG. 4 is an assembled, isometric view of the fixing apparatus of FIG. 2, showing the fixing apparatus in a releasing position.

Referring also to FIG. 4, to retain the HDD 100 in the bracket 20, the latch 25 of the bracket 20 is pushed inward at the toothed urging portion 254 thereof to disengage the hook 252 from the hook 142 of the latch 14 of the first side plate 10 or the latch 14 is pulled outward to disengage the hook 142 from the hook 252 of the latch 25. Then, the first side plate 10 is pivoted about the shaft 50 to move away from the second side plate 24 of the bracket 20 to allow the HDD 100 to be placed in the bracket 20. The fixing pins 40 of the second side plate 24 of the bracket 20 extend into the holes 102 of one sidewall of the HDD 100. Then, the first side plate 20 is pivoted back to the HDD 100 so that the fixing pins 40 of the first side plate 10 extend into the holes 102 of the other sidewall of the HDD 100. Subsequently, the hook 142 of the latch 14 of the first side plate 10 engages with the hook 252 of the latch 25 of the bracket 20. Thus, the HDD 100 is secured.

To release the HDD 100, the hook 142 of the first side plate 10 and the hook 252 of the bracket 20 are disengaged as described above, so that the first side plate 10 can be pivoted away from the HDD 100. Thus, the HDD 100 can be easily removed.

Referring also to FIG. 1, the fixing apparatus assembled with the HDD 100 is inserted into the rack 60, with the platform 18 of the first side plate 10 and the platform 28 of the bracket 20 sliding in the railways 622 of the sidewalls 62 of the rack 60, respectively. When the wedged blocks 184, 284 of the first side plate 10 and the bracket 20 respectively engage in the locking holes 624 of the sidewalls 62 of the rack 60, the bracket 20 is secured in the rack 60. To release the fixing apparatus assembled with the HDD 100 from the rack 60, the operating arms 16, 26 of the first side plate 10 and the bracket 20 are drawn toward each other to disengage the wedged blocks 184, 284 of the first side plate 10 and the bracket 20 from the locking holes 624 of the rack 60. Then, the bracket 20 is slid out of the rack 60.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A fixing apparatus for fixing a hard disk drive (HDD) with a plurality of holes defined in sidewalls thereof, the fixing apparatus comprising:
   a first side plate comprising a pivoting portion at one end thereof, and a latch extending from the other end thereof;
   a bracket comprising an end plate, and a second side plate perpendicularly extending from the end plate, a free end of the end plate pivotably engaging with the pivoting portion of the first side plate, a latch extending from a free end of the second side plate to detachably engage with the latch of the first side plate, wherein the latches of the first and second side plates move toward or away from each other in response to the end plate pivoting relative to the first side plate; and
   a plurality of fixing pins attached to the first and second side plates and engaging in the holes of HDD.

2. The fixing apparatus as claimed in claim 1, wherein the free end of the end plate of the bracket comprises a pair of spaced parallel tabs extending therefrom, a pair of pivoting holes is defined in the tabs, respectively, the pivoting portion of the first side plate is sandwiched between the tabs and comprises a pivoting hole defined therein, a shaft is extended through the pivoting holes of the tabs and the pivoting portion.

3. The fixing apparatus as claimed in claim 1, wherein the latches of the first side plate and the second side plate each comprise a hook formed at a distal end thereof, detachably locking with each other.

4. The fixing apparatus as claimed in claim 1, wherein the first side plate and the second side plate each comprise a platform extending from an outside thereof.

5. The fixing apparatus as claimed in claim 4, wherein a pair of operating arms extends oppositely from ends of the platform, respectively near the latches.

6. The fixing apparatus as claimed in claim 5, wherein a pair of wedged block extends from outsides of the platforms near the operating arms, respectively.

7. The fixing apparatus as claimed in claim 4, further comprising a pair of shock absorbing bars, wherein each of the first side plate and the second side plate comprises a retaining groove defined in an inside thereof, corresponding to the corresponding platform, for receiving the shock absorbing bar therein.

8. The fixing apparatus as claimed in claim 7, wherein each of the shock absorbing bars comprises a plurality of mounting portions formed therein, the first and second side plates each comprises a plurality of mounting holes defined therein to receive the mounting portions of the shock absorbing bar.

9. The fixing apparatus as claimed in claim 8, wherein a plurality of fixing holes is defined in the shock absorbing bars to receive the fixing pins therein.

10. A HDD assembly slidably received in a rack, the HDD assembly comprising:
    a HDD defining a plurality of holes in opposite sidewalls of the HDD; and
    a fixing apparatus receiving the HDD, the fixing apparatus comprising:
      a first side plate attached to one of the opposite sidewalls of the HDD, and comprising a pivoting portion and a latch at opposite ends thereof;
      a bracket attached to the other sidewalls of the HDD, pivotably connected to the pivoting portion of the first side plate about a pivoting axis extending in a first direction, and comprising a latch detachably locking with the latch of the first side plate;
      a pair of shock absorbing bars respectively attached to the first side plate and the bracket, and abutting against the opposite sidewalls of the HDD; and
      a plurality of fixing pins extending from the shock absorbing bars in a second direction substantially perpendicular to the first direction, and inserted into the holes of the HDD.

11. The assembly as claimed in claim 10, wherein the bracket comprises a second side plate, and an end plate perpendicularly extending from the second side plate, a free end of the end plate pivotably engages with the pivoting portion of the first side plate, the latch extends from a free end of the second side plate, the latches of the first side plate and the second side plate move toward or far away from each other in response to the end plate pivoting relative to the first side plate.

12. The assembly as claimed in claim 11, wherein each of the latches of the first side plate and the second side plate comprises a hook formed at a distal end thereof, detachably locking with each other.

13. The assembly as claimed in claim 11, wherein each of the first side plate and the second side plate defines a lengthwise retaining groove, the shock absorbing bars are elongated and respectively retained in the grooves of the first side plate and the second side plate.

14. The assembly as claimed in claim 13, wherein each of the shock absorbing bars comprises a plurality of mounting portions formed therein, each of the first and second side plates defines a plurality of mounting holes communicating with the retaining grooves of respective first and second side plates, the mounting portions are received in the mounting holes of the first and second side plates.

15. The assembly as claimed in claim 11, wherein the rack defines a pair of railways in opposite side walls, each of the first side plate and the second side plate forms a lengthwise platform protruding from an outside thereof and slidably received in the railways of the rack, respectively.

16. The assembly as claimed in claim 15, wherein a pair of operating arms extends oppositely from ends of the platforms near the latches, respectively.

17. The assembly as claimed in claim 16, wherein a pair of wedged blocks extends from outsides of the platforms near the operating arms, respectively.

* * * * *